United States Patent
Polster

(10) Patent No.: US 10,419,833 B2
(45) Date of Patent: Sep. 17, 2019

(54) OPTICAL LINK CLOCK RECEIVER

(71) Applicant: Commissariat à l'Énergie Atomique et aux Énergies Alternatives, Paris (FR)

(72) Inventor: Robert Polster, Berlin (DE)

(73) Assignee: Commissariat à l'Énergie Atomique et aux Énergies Alternatives, Paris (FR)

(*) Notice: Subject to any disclaimer, the term of this patent is extended or adjusted under 35 U.S.C. 154(b) by 50 days.

(21) Appl. No.: 15/048,915

(22) Filed: Feb. 19, 2016

(65) Prior Publication Data
US 2016/0255425 A1   Sep. 1, 2016

(30) Foreign Application Priority Data

Feb. 27, 2015 (FR) .................................... 15 51697

(51) Int. Cl.
*H04B 10/69* (2013.01)
*H04Q 11/00* (2006.01)
*G06F 1/10* (2006.01)
*H04L 7/00* (2006.01)

(52) U.S. Cl.
CPC ......... *H04Q 11/0005* (2013.01); *G06F 1/105* (2013.01); *H04B 10/6911* (2013.01); *H04L 7/0008* (2013.01); *H04L 7/0075* (2013.01); *H04Q 2011/0035* (2013.01); *H04Q 2011/0039* (2013.01)

(58) Field of Classification Search
CPC ...... H04B 10/524; H04B 10/69; H04B 10/39; H04B 10/396; H04B 1/74
See application file for complete search history.

(56) References Cited

U.S. PATENT DOCUMENTS 3,659,082 A * 4/1972 Rolfe .................. G06G 7/24
                                                  327/350
4,366,564 A * 12/1982 de Haan .............. G11B 7/0045
                                                  369/124.14
4,694,504 A    9/1987 Porter et al.
(Continued)

FOREIGN PATENT DOCUMENTS

WO    WO 2013/162517 A1   10/2013

OTHER PUBLICATIONS

"What is voltage? Describe how voltage is used, and why batteries eventually go flat." The Hutchinson Unabridged Encyclopedia with Atlas and Weather Guide, edited by Helicon, 1st edition, 2016. Credo Reference, http://search.credoreference.com/content/entry/heliconhe/what_is_voltage_describe_how_voltage_is_used_and_why_batteries_eventually_go_flat/.*

(Continued)

*Primary Examiner* — Tanya T Motsinger
(74) *Attorney, Agent, or Firm* — Wolf, Greenfield & Sacks, P.C.

(57) ABSTRACT

An optical receiver of an optical link having: a photodiode coupled between a detection node and a first supply voltage rail, the photodiode being adapted to receive an optical clock signal including pulses; a switch coupled between the detection node and a second supply voltage rail; and a first transistor coupled by its main conducting nodes between the second supply voltage rail and a first output node and having its control node coupled to the detection node, wherein the switch is controlled based on a voltage at the first output node.

15 Claims, 4 Drawing Sheets

(56) References Cited

U.S. PATENT DOCUMENTS

| | | | | |
|---|---|---|---|---|
| 5,198,656 | A * | 3/1993 | Chirovsky | G02F 3/028 |
| | | | | 250/214 LS |
| 5,281,805 | A * | 1/1994 | Sauer | H03K 3/011 |
| | | | | 250/214 A |
| 5,414,414 | A * | 5/1995 | Suzuki | H04B 1/74 |
| | | | | 340/2.1 |
| 7,098,438 | B1 * | 8/2006 | Frazier | H03K 3/315 |
| | | | | 250/214 LS |
| 9,197,471 | B1 * | 11/2015 | Zanoni | H04L 27/223 |
| 9,835,931 | B1 * | 12/2017 | Pelteku | H03M 1/52 |
| 2009/0060511 | A1 * | 3/2009 | Toyoshima | H04B 10/61 |
| | | | | 398/74 |
| 2009/0153231 | A1 * | 6/2009 | Pan | G11C 5/145 |
| | | | | 327/536 |
| 2010/0172658 | A1 * | 7/2010 | Suzuki | H04B 10/69 |
| | | | | 398/208 |
| 2010/0253616 | A1 * | 10/2010 | Omi | G01J 1/02 |
| | | | | 345/102 |
| 2011/0135320 | A1 * | 6/2011 | Amberg | H04B 10/69 |
| | | | | 398/208 |
| 2011/0202315 | A1 * | 8/2011 | Klabunde | H03F 1/32 |
| | | | | 702/189 |
| 2013/0141617 | A1 * | 6/2013 | Soda | H01L 27/14636 |
| | | | | 348/294 |
| 2013/0216241 | A1 * | 8/2013 | Proesel | G01J 1/46 |
| | | | | 398/213 |
| 2015/0066438 | A1 * | 3/2015 | Brooks | H03K 3/0231 |
| | | | | 702/191 |
| 2016/0227135 | A1 * | 8/2016 | Matolin | H04N 3/155 |
| 2016/0255425 | A1 * | 9/2016 | Polster | H04Q 11/0005 |
| | | | | 398/45 |
| 2016/0285563 | A1 * | 9/2016 | Tanaka | H04B 10/69 |
| 2018/0195897 | A1 * | 7/2018 | Raynor | G01J 1/44 |

OTHER PUBLICATIONS

Search Report, dated Jan. 27, 2016, from corresponding French Application No. 15/51697.

Bhatnagar et al.: "Receiverless detection schemes for optical clock distribution," Proceedings of SPIE, vol. 5359 (2006); pp. 352-359.

Gathman & Buckwalter: "A 45-nm SOI CMOS Integrate-and-Dump Optical Sampling Receiver," IEEE Transactions on Circuits and Systems; vol. 60 (2013); pp. 469-478.

Jindal: "Silicon MOS Amplifier Operation in the Integrate and Dump Mode for Gigahertz Band Lightwave Communications Systems," Journal of Lightwave Technology; vol. 8 (1990); pp. 1023-1026.

* cited by examiner

OPTICAL LINK CLOCK RECEIVER

CROSS-REFERENCE TO RELATED APPLICATIONS

This application claims the priority benefit of French patent application number 15/51697, filed on Feb. 27, 2015, which is hereby incorporated by reference in its entirety to the maximum extent allowable by law.

FIELD

The present disclosure relates to the field of optical communications, and in particular to an optical receiver of an optical link for receiving a clock signal.

BACKGROUND

Optical links provide high data transmission rates at low power, and thus present a solution for replacing ordinary copper interconnects between integrated circuits. Optical reception is based on capturing, using a photosensitive device such as a photodiode, a light signal that is generally encoded in a digital fashion, and which may have a power level as low as 10 µW. The photosensitive device for example generates a small current that is transformed by the optical receiver into a digital voltage signal.

In order to correctly receive a data signal transmitted optically over such an optical link, it is generally necessary to receive a timing signal over the optical link. In some embodiments, the timing signal may be extracted from the data signal itself, but such solutions tend to be complex to implement. Indeed, the data encoding will generally mean that a timing edge is not present in the data signal for each data bit of the data transmitted over the link.

Alternative solutions use a separate clock channel for transmitting a clock signal. In order to reduce power consumption, it has been proposed to transmit the clock signal over the optical link as a series of pulses rather than as a clock signal having a 50% duty cycle. For example, such a technique is described in the publication by A. Bhatnagar et al. entitled "Receiverless detection schemes for optical clock distribution", Proceedings of the SPIE—The International Society for Optical Engineering, 6 Jul. 2004, vol. 5359, no. 1, p. 352-9. According to the technique described in this publication, the optical clock signal is transmitted as two sequences of pulses, each of which is received by a corresponding photodiode and converted into a voltage signal. However, a high level of charge is required to charge the parasitic capacitances of the two photodiodes and trigger the detection by a voltage amplifier. Furthermore, the two photodiodes lead to a relatively large footprint of the circuit.

There is thus a need in the art for an optical receiver suitable for receiving a low power optical signal and having reduced power consumption and/or reduced surface area with respect to existing solutions.

SUMMARY

It is an aim of embodiments of the present disclosure to at least partially address one or more needs in the prior art.

According to one aspect, there is provided an optical receiver of an optical link comprising: a photodiode coupled between a detection node and a first supply voltage rail, the photodiode being adapted to receive an optical clock signal comprising pulses; a switch coupled between the detection node and a second supply voltage rail; and a first transistor coupled by its main conducting nodes between the second supply voltage rail and a first output node and having its control node coupled to the detection node, wherein the switch is controlled based on a voltage at the first output node.

According to one embodiment, the switch is coupled to the second supply voltage rail via a voltage offsetting device.

According to one embodiment, the voltage offsetting device is a diode-connected transistor.

According to one embodiment, the optical receiver further comprises a second transistor coupled by its main conducting nodes between the first output node and the first supply voltage rail and having its control node coupled to the detection node.

According to one embodiment, the first output node is coupled to the first supply voltage rail via the series connection of one or more further switches controlled by a clock duty cycle control signal.

According to one embodiment, the series connection of one or more further switches is coupled to the first supply voltage rail via a further diode-connected transistor.

According to one embodiment, the optical receiver further comprises: a low pass filter coupled to the first output node; and a comparator adapted to control said switch based on a comparison between an output voltage of the low pass filter and a threshold level.

According to one embodiment, the low pass filter comprises at least one of: a variable resistor; and a variable capacitor.

According to one embodiment, the low pass filter is an RC filter comprising a resistor and a transistor coupled in parallel between the first output node and an intermediate node, and a variable capacitor, formed of a transistor gate, coupled to the intermediate node.

According to one embodiment, the threshold voltage is generated by a duty cycle control circuit adapted to adjust the duty cycle of the clock signal.

According to one embodiment, the comparator is implemented by an inverter, the threshold level being the threshold voltage of the inverter.

According to one embodiment, the optical receiver further comprises a sequence of one or more inverters coupled to the first output node and providing said clock signal.

According to one embodiment, the optical receiver further comprises a duty cycle detection circuit comprising: a first low pass filter coupled to the output of a first inverter of said sequence of inverters; a second low pass filter coupled to the output of a second inverter of said sequence of inverters, the outputs of the first and second inverters being separated by an odd number of inverters of the sequence of inverters; and a voltage integrator adapted to generate an output voltage as a function of a voltage difference between output voltages of the first and second low pass filters, wherein the voltage integrator is adapted to control the RC value of the low pass filter.

According to one embodiment, the voltage integrator comprises a current mirror having: a first branch conducting a first current based on the output voltage of the first low pass filter; and a second branch comprising a second transistor conducting a second current based on the first current, and a third transistor conducting a third current based on the output voltage of the second low pass filter, an intermediate node between the second and third transistors providing the output voltage of the voltage integrator.

According to a further embodiment, there is provided a method of receiving a clock signal over an optical link comprising: receiving, by a photodiode coupled between a detection node and a first supply voltage rail, an optical clock transmission signal; and controlling a switch, coupled between the detection node and a second supply voltage rail, based on a voltage at a first output node, the first output node being coupled by the main conducting nodes of a first transistor to the second supply voltage rail and having its control node coupled to the detection node.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Throughout the present description, the term "connected" is used to designate a direct connection between two elements, whereas the term "coupled" is used to designate a connection between two elements that may be direct, or may be via one or more other components such as resistors, capacitors or transistors. Furthermore, as used herein, the term "substantially" is used to designate a range of +/−10 percent of the value in question.

Figure 1:
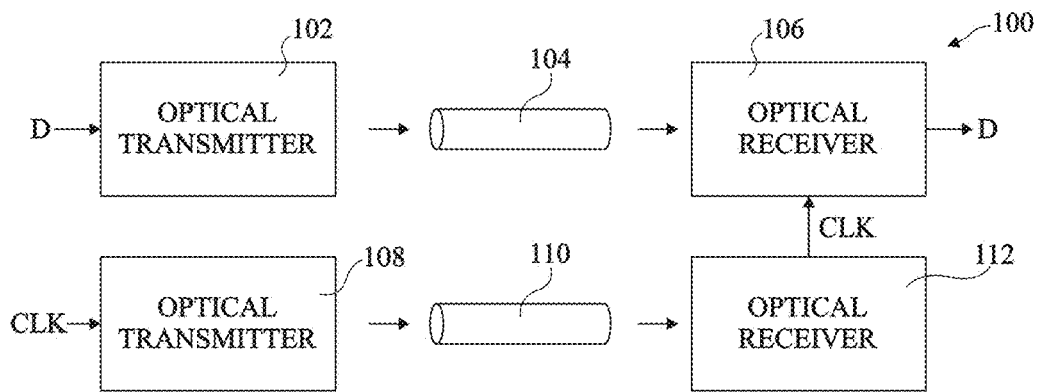
FIG. 1 schematically illustrates an optical link according to an example embodiment.

FIG. 1 schematically illustrates an optical link 100. As illustrated, on a transmission side, a data signal D is converted by an optical transmitter (OPTICAL TRANSMITTER) 102 into an optical signal, which is transmitted via a waveguide 104 to reception side of the optical link. On the reception side, the optical signal is received by an optical receiver (OPTICAL RECEIVER) 106, which converts the optical signal back into the data signal D. To do so, it uses a clock signal CLK, which is transmitted via a separate clock channel of the optical link. In particular, on the transmission side, a clock signal CLK is converted into an optical signal by a further optical transmitter (OPTICAL TRANSMITTER) 108. This optical signal is transmitted by a further waveguide 110 to the reception side, where it is received by a further optical receiver (OPTICAL RECEIVER) 112, and reconverted into a voltage signal CLK, which is provided to the optical receiver 106 to enable the optical data signal to be correctly received.

The optical receiver 112 uses an "integrate and dump" reception technique adapted to reception of a clock signal, as will now be described in more detail with reference to FIG. 2. The circuit receives clock pulses, and converts these pulses into a clock signal having a duty cycle of substantially 50% by using a feedback signal to reset the input signal.

Figure 2:
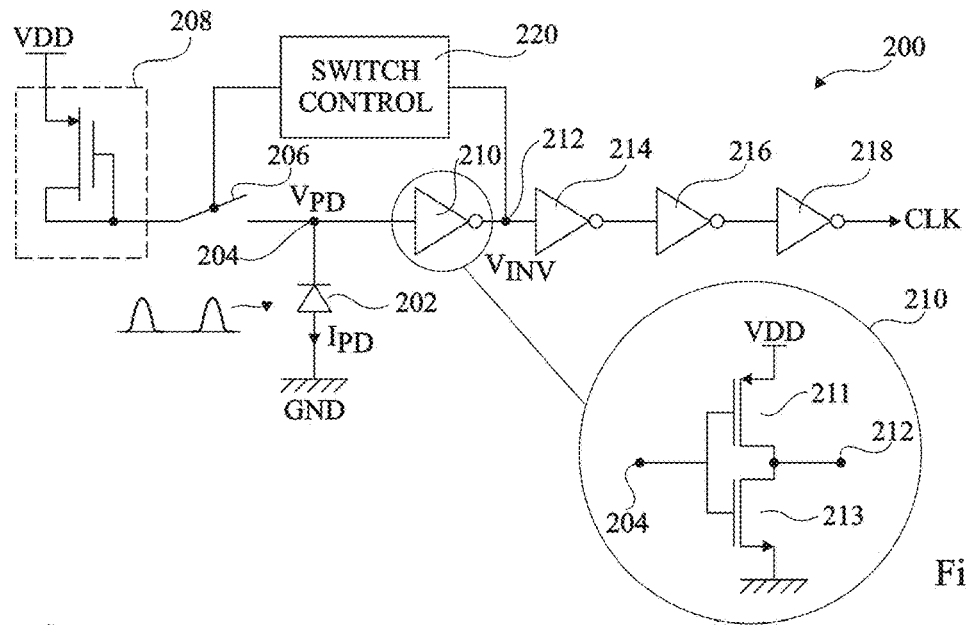
FIG. 2 schematically illustrates an optical receiver according to an example embodiment.

FIG. 2 schematically illustrates an optical receiver 200 according to an example embodiment. For example, this circuit is used to implement the optical receiver 112 of the optical link of FIG. 1.

The circuit 200 comprises a photodiode 202 adapted to receive the optical clock signal formed of pulses. The photodiode 202 for example has its cathode coupled to a detection node 204 of the receiver, and its anode coupled to ground. The current conducted by the photodiode 202 is designated IPD. The detection node 204 is also coupled, via a switch 206, to a supply voltage rail VDD. In the example of FIG. 2, the switch 206 is coupled to VDD via a diode-connected transistor 208, which is for example a MOS transistor having its gate coupled to its drain. In alternative embodiments, the switch 206 could be connected directly to the supply voltage rail VDD.

The detection node 204 is further coupled to an inverter chain. For example, the node 204 is coupled to the input of an inverter 210, which provides at its output node 212, a voltage signal VINV. An example of the circuit forming the inverter 210 is illustrated in FIG. 2, and comprises a PMOS transistor 211 and an NMOS transistor 213 coupled in series with each other by their main conducting nodes between the supply voltage VDD and ground. The control nodes of transistors 211, 213 are coupled to the detection node 204, and the drains of transistors 211, 213 are coupled to the output node 212.

The output node 212 is in turn coupled the input of an inverter 214, which in turn has its output coupled to the input of a further inverter 216, which in turn has its output coupled to the input of yet a further inverter 218. The output of the inverter 218 for example provides the clock signal CLK at the output of the optical receiver 200. The inverters 214, 216 and 218 for example provide amplification. In alternative embodiments, a different number of inverters could be used in the inverter chain, and for example one or more of the inverters could be omitted.

The switch 206 is for example controlled based on the voltage signal VINV at the output of the inverter 212. For example, a feedback path comprises a switch control circuit (SWITCH CONTROL) 220, which generates a signal for controlling the switch 206 based on the signal VINV at node 212. In alternative embodiments, the switch 206 could however be controlled by the output voltage of any of the other inverters in the chain. In some embodiments, the switch control circuit 220 comprises a delay line for delaying the signal 212, for example by a time delay corresponding to between 10 and 50 percent of the clock period.

For example, while not illustrated in FIG. 2, the switch 206 may comprise an NMOS transistor having its gate coupled to the node 212, and coupled by its main conducting nodes between the node 204 and the diode-connected transistor 208, and/or a PMOS transistor having its gate coupled to the node 212 via an inverter, and coupled by its main conducting nodes between the node 204 and the diode-connected transistor 208. Alternatively, the switch 206 could be implemented by a boot-strapped switch.

Operation of the optical receiver 200 will now be described in more detail with reference to FIG. 3.

Figure 3:
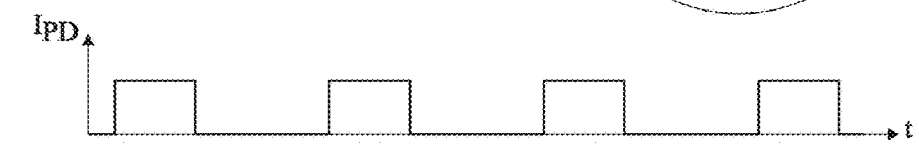
FIG. 3 shows timing diagrams of signals in the circuit of FIG. 2 according to an example embodiment.
Figure 3:
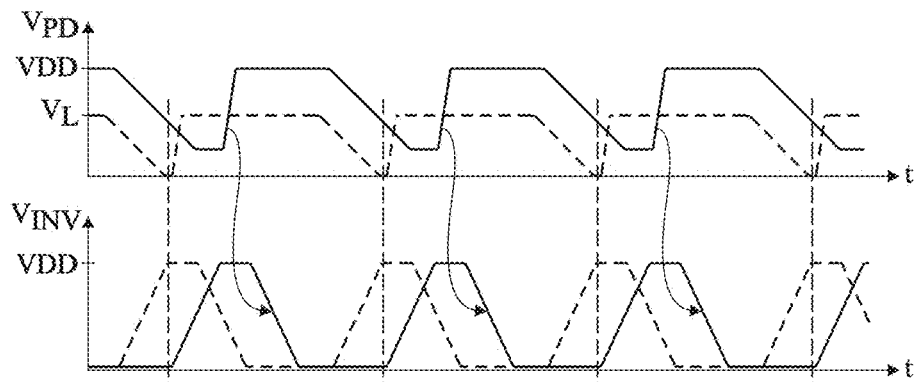

FIG. 3 is a timing diagram showing examples of the timing of the photodiode current IPD, the voltage VPD at the detection node 204, and the voltage VINV at the node 212 of the optical receiver 200.

The photodiode current IPD for example comprises a series of high pulses, corresponding to light pulses transmitted over the clock channel of the optical link. These pulses are for example transmitted at a frequency of any-where between 1 Hz up to 10 GHz or higher. Each pulse is for example relatively short, for example having a duration of 40% or less of the clock period. However, the receivers described herein can operate with any length pulse, and can for example be used to correct a duty cycle of more than 50 percent. The current level during each high pulse is for example in the range 1 µA to 100 µA.

The voltage VPD at the detection node 204 is for example initially high, and falls relatively linearly during each high photodiode current pulse as the capacitances associated with the detection node 204 are discharged by the photodiode current IPD.

Solid line curves representing the signals VPD and VINV correspond to the case in which the diode-connected transistor 208 is not present, and thus the voltage VPD is reset by the switch 206 to the supply voltage level VDD. The voltage VPD is thus initially at VDD, and the voltage VINV is at the ground level. During the high pulse of the photodiode current IPD, the voltage VPD falls, and when it falls below a threshold level of the inverter 210, equal for example to substantially VDD/2, the output voltage of the inverter 210 starts to rise. When this voltage has risen sufficiently, for example to substantially VDD/2, the switch 206 becomes conductive, resetting the voltage VPD at the detection node 204 to the supply voltage level VDD. This in turn causes the output of the inverter 210 to fall low again, and the switch 206 is thus returned to the non-conductive state.

It will be noted that if the switch 206 is connected directly to the VDD supply rail and the voltage VPD is thus reset to VDD, a relatively high charge is conducted by the photodiode 202 in order to switch the state of the inverter 210, in other words to change the output voltage VINV from a low voltage to a high voltage. By connecting the switch 206 to the supply rail VDD via the diode-connected transistor 208, a lower level of charge conducted by the photodiode 202 is sufficient to switch the state of the inverter 210. Indeed, dashed curves in FIG. 3 illustrate the case in which the diode-connected transistor 208 is present. The reset level of the voltage VPD starting at a lower level VL, a same photodiode current IPD causes a faster switching of the state of the inverter 210, and thus leads to a reduced energy consumption. The diode-connected transistor 208 will reduce the supply voltage VDD by a gate-source voltage VGS, and thus the level VL is for example equal to VDD-VGS. The gate-source voltage VGS is for example equal to the transistor threshold voltage VTH of the transistor 208. The diode-connected transistor 208 is for example a PMOS transistor 211 having the same dimensions as the PMOS transistor of the inverter 210, and thus the voltage VGS is for example substantially equal to the threshold voltage of the PMOS transistor 211.

In alternative embodiments, rather than a diode-connected transistor 208, an alternative voltage reducing device could be used between VDD and the switch 204, such as one or more diodes.

In some embodiments, the clock signal CLK generated by the optical receiver 200 of FIG. 2 may have an unbalanced duty cycle, in other words high pulses and low pulses that are not equal to half of the clock period. One solution for bringing the duty cycle of the clock signal to substantially 50 percent is illustrated in FIG. 4.

Figure 4:
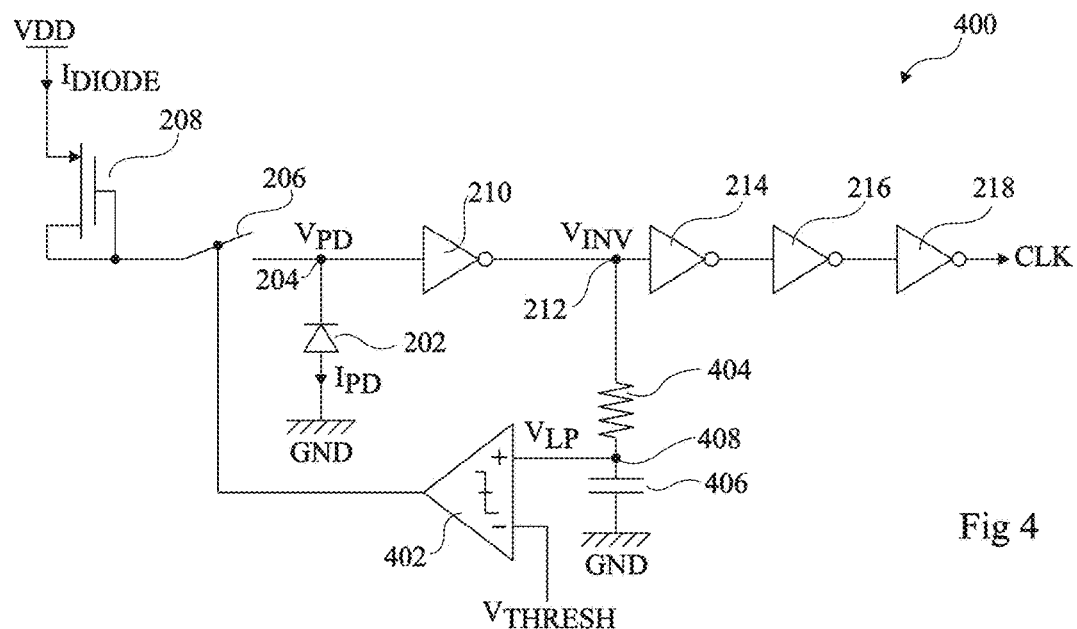
FIG. 4 schematically illustrates an optical receiver according to a further example embodiment.

FIG. 4 schematically illustrates an optical receiver 400 according to a further example embodiment, and which for example implements the receiver 112 of FIG. 1. Many features of this circuit are the same as those of the receiver 200 of FIG. 2, and such features have been labelled with like reference numerals and will not be described again in detail.

In the embodiment of FIG. 4, rather than the node 212 being connected directly to control the switch 206, it is coupled to control the switch 206 via a low pass filter and a comparator 402. For example the low pass filter comprises a resistor 404 and a capacitor 406 coupled in series with each other between the node 212 and ground. An intermediate node 408 between the resistor 404 and the capacitor 406 is coupled to a positive input of the comparator 402. A negative input of the comparator 402 for example receives a threshold voltage VTH. The output of the comparator 402 controls the switch 206.

In operation, the comparator 402 for example only resets the switch 206 when the voltage VLP at the intermediate node 408 exceeds the threshold voltage VTH. The voltage VLP will rise following the rising edge of the voltage VINV at a rate based on the time constant of the low pass filter, thereby introducing a delay that provides stability during the resetting operation. In the embodiment of FIG. 4, the low pass filter has a fixed RC value. The time delay between the rising edge of the voltage VINV and the activation of the switch 206 can thus be controlled by the level of the threshold voltage VTHRESH. The threshold voltage VTHRESH is for example generated by a duty cycle control circuit (not illustrated in FIG. 4) adapted to adjust the duty cycle of the clock signal.

Figure 5:
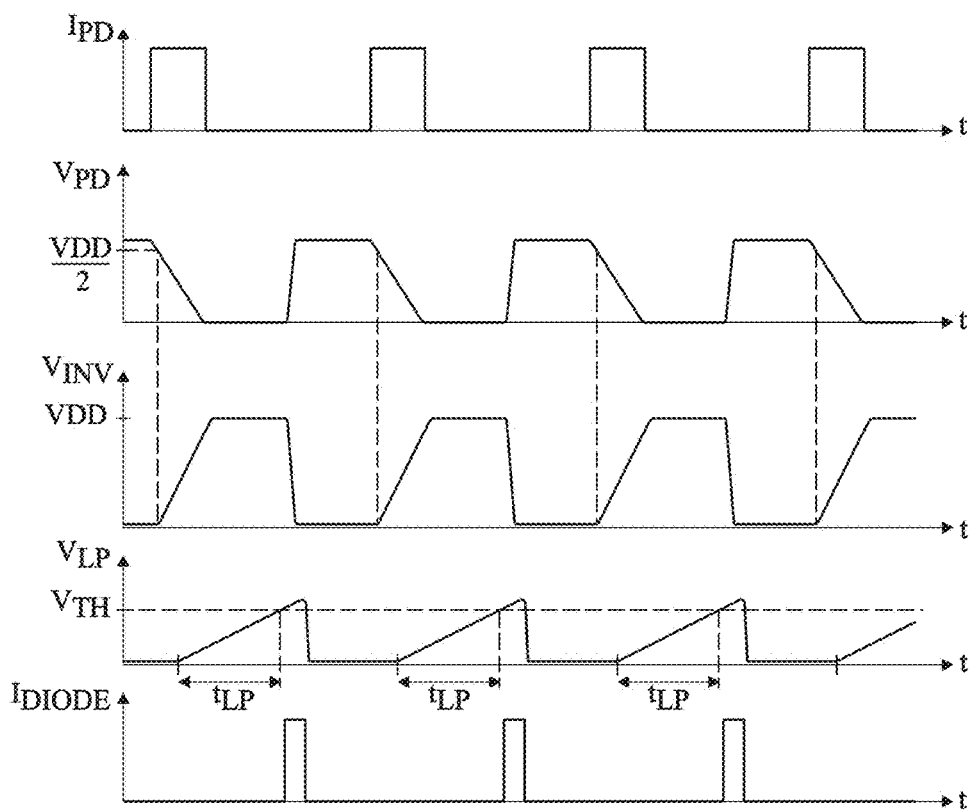
FIG. 5 shows timing diagrams of signals in the circuit of FIG. 4 according to an example embodiment.

FIG. 5 is a timing diagram illustrating the signals IPD, VPD, VINV, VLP and the current IDIODE through the diode-connected transistor 208 of FIG. 4 according to an example embodiment. As illustrated, the voltage VPD at the node 204 is not reset directly the voltage VINV goes high. Instead, the voltage is reset only once the voltage VLP passes the threshold voltage VTH, a time delay tLP after the voltage VINV starts to rise.

Figure 6:
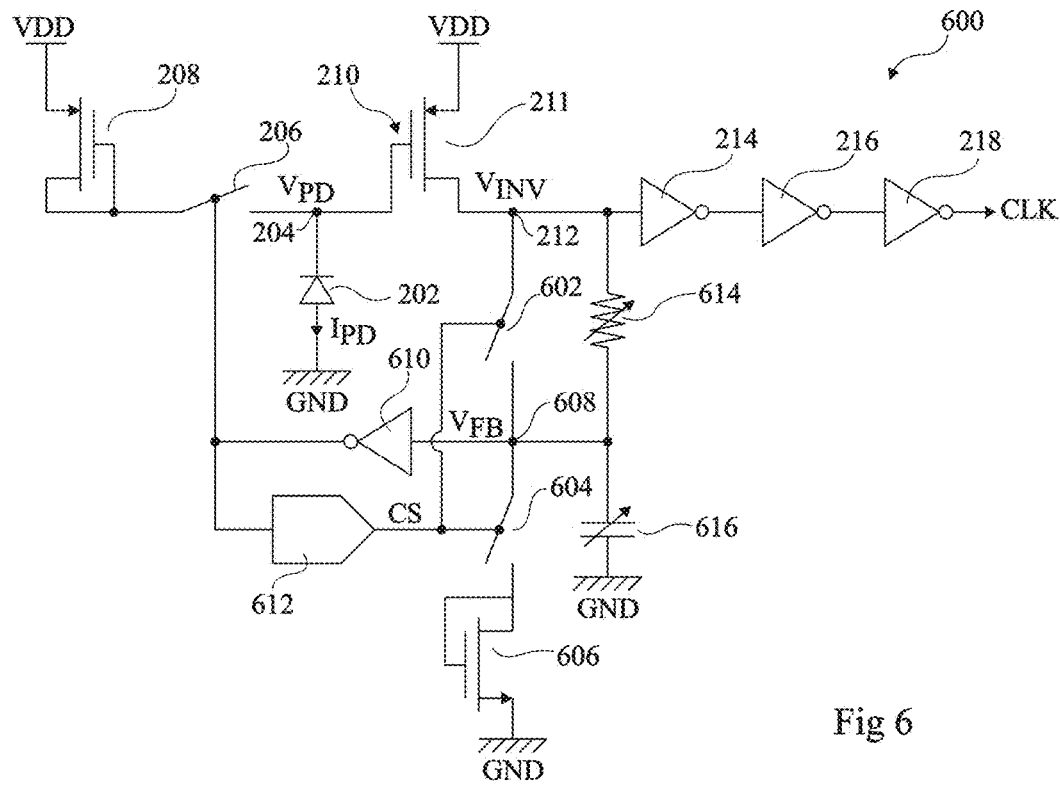
FIG. 6 schematically illustrates an optical receiver according to yet a further example embodiment.

FIG. 6 illustrates an optical receiver 600 according to yet a further embodiment, and which for example implements the receiver 112 of FIG. 1. Elements in common with the embodiment of FIG. 4 have been labelled with like reference numerals, and will not be described again in detail.

In the circuit 600, the PMOS transistor 211 of the inverter 210 is present, but the NMOS transistor 213 of this inverter has been removed, and is replaced by switches 602 and 604 coupled in series between the node 212 and ground, for resetting the voltage at node 212 to a low voltage level. In the example of FIG. 6, a diode-connected NMOS transistor 606 is also coupled between the switch 604 and ground, such that the voltage at node 212 is reset to a level equal to the VGS voltage of the transistor 606, equal to the threshold voltage VTH of the transistor. In alternative embodiments, the diode-connected transistor 606 could be omitted, or replaced by an alternative voltage offsetting device such as one or more diodes. An advantage of removing the NMOS transistor 213 of the inverter 210 is that the capacitance at the node 204 will be reduced, implying a greater reduction in the charge to be conducted by the photodiode 202 in order to change the state of the voltage VINV.

In the optical receiver 600, the comparator 402 of FIG. 4 is implemented by an inverter. In particular, an intermediate node 608 between the switches 602 and 604 is coupled, by an inverter 610, to control the switch 206. The voltage at the output of the inverter 610 is also used to control the switches 602 and 604. In the example of FIG. 6, a pulse extending device 612 is coupled to the output of the inverter 610 and generates a duty cycle control signal CS for controlling the switches 602, 604 based on the output voltage of the inverter 610. Furthermore, the low pass filter of FIG. 4 is replaced in FIG. 6 by a variable low pass filter formed by a variable resistor 614 in series with a variable capacitor 616 coupled between the node 212 and ground. An intermediate node between these components is coupled to the node 608.

The variable resistor 614 and variable capacitor are for example controlled by one or more control signals (not illustrated in FIG. 6) in order to tune the duty cycle to an appropriate level. For example, the variable resistor 614 could have a resistance controlled in an analog fashion, or by a digital control signal. Similarly, the variable capacitor 616 could have a capacitance controlled in an analog fashion, or by a digital control signal. In some embodiments, only one of the components 614, 616 could be variable, and the other of fixed capacitance or resistance.

In operation, initially the output of the inverter 610 is high, the switches 602 and 604 are non-conducting, and the voltage VFB at the intermediate node 608 is equal to the threshold voltage VTH of transistor 606. When the voltage VINV at node 212 rises, the voltage VFB at the intermediate node 608 will also rise until the output of the inverter 610 goes low, which in this example renders the switch 206 conductive to reset the voltage VPD. Furthermore, in response to the falling voltage at the output of the inverter 610, the device 612 will render conductive the switches 602, 604 for a certain time duration in order to reset the voltage VINV to the level of the threshold voltage VTH of transistor 606. This will also bring the voltage VFB at the intermediate node back to the level of the threshold voltage VTH of transistor 606, causing the output of the inverter 610 to go high again, and render the switch 206 non-conductive again. The resistance of the variable resistor 614 and/or the capacitance of the variable capacitor 616 is for example tuned in order to achieve an appropriate time delay between a rising edge at the node 212 and the falling edge at the output of the inverter 610.

Figure 7:
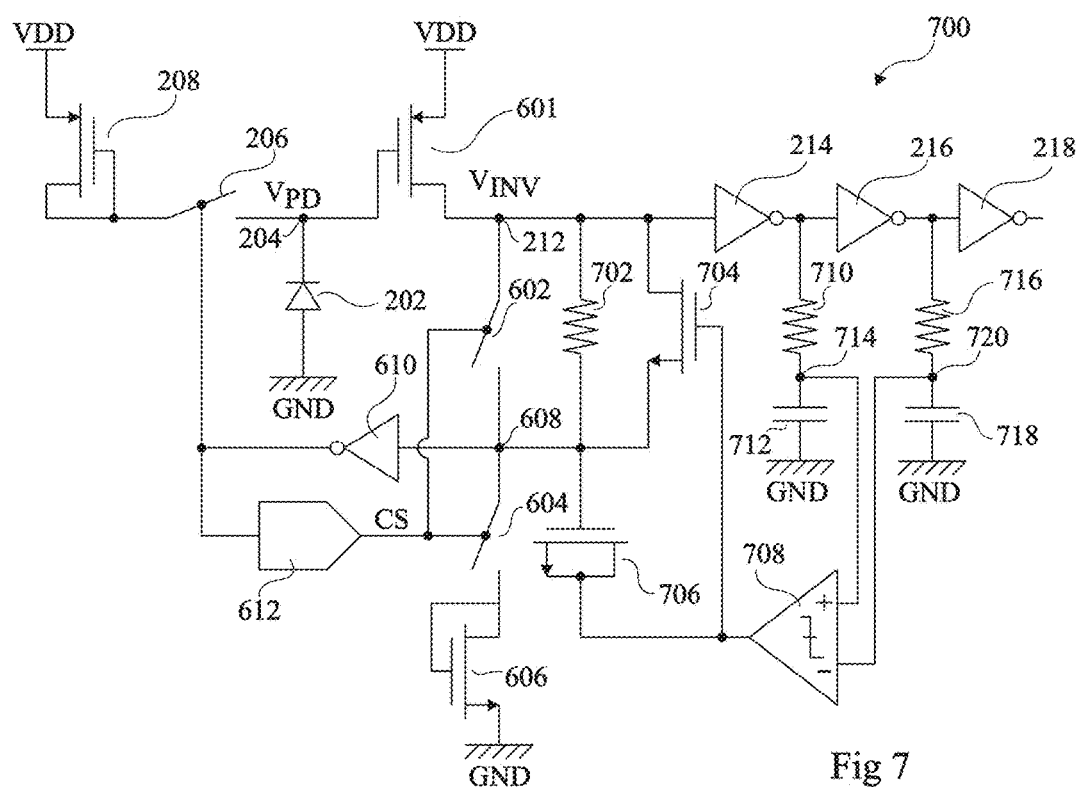
FIG. 7 schematically illustrates an optical receiver according to yet a further example embodiment.

FIG. 7 illustrates an optical receiver 700 according to yet a further embodiment, and which for example implements the receiver 112 of FIG. 1. Elements in common with the embodiment of FIG. 6 have been labelled with like reference numerals, and will not be described again in detail.

In the embodiment 700, the variable resistor of FIG. 6 is implemented by a resistor 702 of fixed resistance coupled in parallel with a transistor 704 between the node 212 and the intermediate node 608. Furthermore, in FIG. 7, the variable capacitive device 706 is for example implemented by a transistor gate, for example by an FDSOI (fully depleted silicon on insulator) transistor having its gate forming one node of the capacitor coupled to the intermediate node 608, and its back gate, source and drain connected together to form the other node of the capacitor coupled to the output of a voltage integrator 708.

The inputs of the integrator 708 are coupled to a circuit for detecting a miss-match between the duty cycles of the clock signal. This circuit for example comprises a pair of low pass filters respectively coupled to two different nodes of the inverter chain separated by an odd number of inverters, such that one signal is the inversion of the other. For example, a low pass filter formed by a series connection of a resistor 710 and a capacitor 712 is coupled between the output of the inverter 214 and ground, and an intermediate node 714 between these components is coupled to the positive input of the integrator 708. Furthermore, a low pass filter formed by a series connection of a resistor 716 and a capacitor 718 is coupled between the output of the inverter 216 and ground, and an intermediate node 720 between these components is coupled to the negative input of the integrator 708. The outputs of the inverters 214 and 216 having opposite voltage states, when the duty cycle of the clock signal is well balanced, the voltages at the intermediate nodes 714 and 720 should be at substantially the same level. Any difference between these voltages indicates a miss-match in the duty cycle.

The integrator 708 controls the time constant of the low pass filter formed by the components 702, 704 and 706, and thus the duty cycle of the clock signal, based on the difference between the voltages at the intermediate nodes 714 and 720. In particular, the resistance of the RC filter is controlled by the voltage applied by the integrator 708 to the gate of the transistor 704, and the capacitance is controlled by the voltage applied by the integrator 708 to the capacitor 706.

Figure 8:
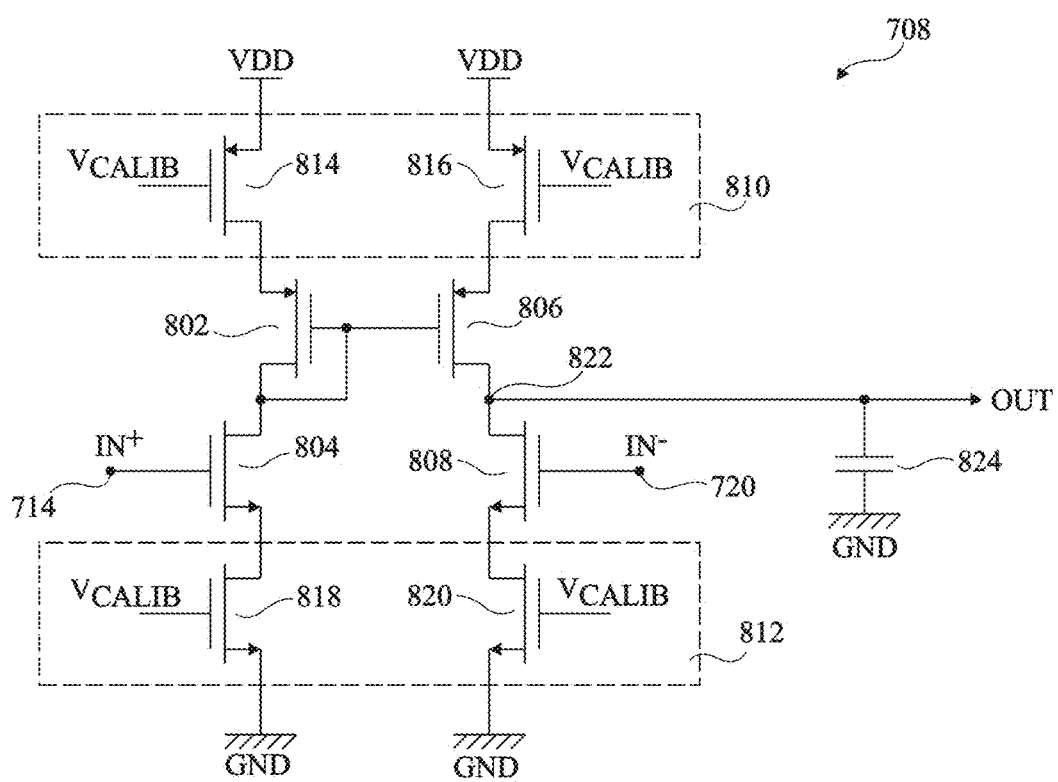
FIG. 8 illustrates a voltage integrator of the circuit of FIG. 7 in more detail according to an example embodiment.

FIG. 8 illustrates the voltage integrator 708 of FIG. 7 in more detail according to an example embodiment.

The integrator 708 for example comprises a current mirror having a reference branch formed of a series connection of transistors 802 and 804 coupled between VDD and ground, and a further branch formed of a series connection of transistors 806 and 808 coupled between VDD and ground. The transistors 804 and 808 respectively receive at their control nodes the signals IN+ and IN− provided respectively by the intermediate nodes 714 and 720 of FIG. 7. The control nodes of transistors 802 and 806 are coupled together, and to an intermediate node between the transistors 802 and 804. An intermediate node 822 between the transistors 806 and 808 provides the output of the integrator 708, and is for example coupled to ground via a capacitor 824.

Optionally, calibration circuits 810 and 812 are respectively provided between the transistors 802 and 806 and the supply voltage VDD, and between the transistors 804 and 808 and ground. For example, the circuit 810 comprises a PMOS transistor 814 coupled via its main conducting nodes between the transistor 802 and the supply voltage VDD, and a transistor 816 coupled by its main conducting nodes between the transistor 806 and VDD. The transistors 814 and 816 are for example controlled by a voltage VCALIB. Similarly, the circuit 812 for example comprises an NMOS transistor 818 coupled between the source of transistor 804 and ground, and an NMOS transistor 820 coupled between the source of transistor 808 and ground. The transistors 818 and 820 are for example controlled by the calibration voltage VCALIB.

In operation, the transistor 806 will conduct a current based on the input signal IN+, whereas the transistor 808 will conduct a current based on the input signal IN−. Therefore, any miss-match between the voltages IN+ and IN− at the nodes 714 and 720 will result in a current difference between the currents conducted by the transistors 806 and 808, and thus a residual current at the output node 822 causing a change in the voltage stored by the capacitor 824.

By adjusting the calibration voltage VCALIB, compensation can be provided for any mismatch between the components such that the duty cycle of the clock signal is well balanced.

An advantage of the circuit of FIG. 8 is that it functions correctly under DC conditions and its consumption is very low.

An advantage of the embodiments described herein is that the optical receiver has a relatively low energy consumption while permitting a low power optical signal to be received.

Having thus described at least one illustrative embodiment, various alterations, modifications and improvements will readily occur to those skilled in the art.

For example, it will be apparent to those skilled in the art that embodiments have been described based on MOS transistors, alternative embodiments could at least partially be based on other transistor technologies such as bipolar technology.

Furthermore, it will be apparent to those skilled in the art how the positive supply rail and ground rail in the various embodiments could be exchanged with each other, and that rather than a ground voltage, a different supply voltage level could be used, such as a negative voltage.

Furthermore, while embodiments have been illustrated in FIGS. 2 and 6 in which the output node 212 is coupled to ground via a transistor 213 forming part of an inverter or coupled to ground via a series connection of switches 602, 604, it will be apparent to those skilled in the art that, according to yet further alternative embodiments, the output node could be coupled in other ways, and FIGS. 2 and 6 merely represent two specific examples.

Furthermore, it will be apparent to those skilled in the art that, while in some embodiments the receiver described herein is used to correct a duty cycle of less than 50 percent by bringing it to a value of substantially 50 percent, other applications would be possible. For example, the receiver could correct the duty cycle by reducing it from a value higher than 50 percent to a value of substantially 50 percent. Furthermore, in some embodiments, the duty cycle could be corrected to a value different from 50 percent, such as 40 or 60 percent.

Furthermore, it will be apparent to those skilled in the art that the various features described in relation to the various embodiments could be combined, in alternative embodiments, in any combination.

What is claimed is:

1. An optical receiving device of an optical link, the optical receiving device comprising:
    a first optical receiver configured to convert an optical data signal into an electrical data signal using an electrical clock signal; and
    a second optical receiver configured to convert an optical clock signal into said electrical clock signal, the second optical receiver comprising:
        a photodiode coupled between a detection node and a first voltage rail, the photodiode being adapted to receive said optical clock signal comprising pulses;
        a switch coupled between the detection node and a second voltage rail; and
        a first transistor coupled by its main conducting nodes between the second voltage rail and a first output node and having its control node coupled to the detection node, wherein, when a voltage at the detection node passes a threshold level, the first transistor is rendered conductive, causing a voltage at the first output node to be asserted, and thereby causing the switch to be activated and then deactivated to reset the voltage at the detection node.

2. The optical receiving device of claim 1, wherein the switch is coupled to the second voltage rail via a voltage offsetting device.

3. The optical receiving device of claim 2, wherein the voltage offsetting device is a diode-connected transistor.

4. The optical receiving device of claim 1, further comprising a second transistor coupled by its main conducting nodes between the first output node and the first voltage rail and having its control node coupled to the detection node.

5. The optical receiving device of claim 1, wherein the first output node is coupled to the first voltage rail via the series connection of one or more further switches controlled by a clock duty cycle control signal.

6. The optical receiving device of claim 5, wherein the series connection of one or more further switches is coupled to the first voltage rail via a further diode-connected transistor.

7. The optical receiving device of claim 1, further comprising:
    a low pass filter coupled to the first output node; and
    a comparator adapted to control said switch based on a comparison between an output voltage of the low pass filter and a threshold level.

8. The optical receiving device of claim 7, wherein said low pass filter
    comprises at least one of:
    a variable resistor; and
    a variable capacitor.

9. The optical receiving device of claim 7, wherein said low pass filter is an RC (resistor capacitor) filter comprising a resistor and a transistor coupled in parallel between the first output node and an intermediate node, and a variable capacitor, formed of a transistor gate, coupled to the intermediate node.

10. The optical receiving device of claim 7, wherein the threshold voltage is generated by a duty cycle control circuit adapted to adjust the duty cycle of the clock signal.

11. The optical receiving device claim 7, wherein the comparator is implemented by an inverter, the threshold level being the threshold voltage of the inverter.

12. The optical receiving device of claim 7, further comprising a sequence of one or more inverters coupled to the first output node and providing said electrical clock signal.

13. The optical receiving device of claim 12, further comprising a duty cycle detection circuit comprising:
    a first low pass filter coupled to the output of a first inverter of said sequence of inverters;
    a second low pass filter coupled to the output of a second inverter of said sequence of inverters, the outputs of the first and second inverters being separated by an odd number of inverters of the sequence of inverters; and
    a voltage integrator adapted to generate an output voltage as a function of a voltage difference between output voltages of the first and second low pass filters, wherein the voltage integrator is adapted to control the RC value of the low pass filter.

14. The optical receiving device of claim 12, wherein the voltage integrator comprises a current mirror having:
    a first branch conducting a first current based on the output voltage of the first low pass filter; and
    a second branch comprising a second transistor conducting a second current based on the first current, and a third transistor conducting a third current based on the output voltage of the second low pass filter, an intermediate node between the second and third transistors providing the output voltage of the voltage integrator.

15. A method of receiving data over an optical link comprising:
    converting, using a first optical receiver, an optical data signal into an electrical data signal using an electrical clock signal; and
    converting, by a second optical receiver, an optical clock signal into said electrical clock signal, comprising:
        receiving, by a photodiode coupled between a detection node and a first voltage rail, an optical clock transmission signal, the detection node being coupled to a control node of a first transistor that is coupled by its main conducting nodes between a second voltage rail and a first output node; and resetting a voltage at the detection node by activating and then deactivating a switch coupled between the detection node and a second voltage rail in response to a voltage at a first output node being asserted, the voltage at the first output node being asserted when the voltage at the detection node passes a threshold level, causing the first transistor to be rendered conductive.

\* \* \* \* \*